United States Patent
Ruvio et al.

(10) Patent No.: US 10,757,114 B2
(45) Date of Patent: Aug. 25, 2020

(54) SYSTEMS AND METHODS FOR DETECTION OF MALICIOUS ACTIVITY IN VEHICLE DATA COMMUNICATION NETWORKS

(71) Applicant: Tower-Sec Ltd., Kfar-Saba (IL)

(72) Inventors: Guy Ruvio, ElAd (IL); Saar Yaacov Dickman, Zur-Moshe (IL); Yuval Weisglass, Kfar-Saba (IL); Anuja Sonalker, Ellicott City, MD (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 221 days.

(21) Appl. No.: 15/761,410

(22) PCT Filed: Sep. 18, 2016

(86) PCT No.: PCT/IL2016/051033
§ 371 (c)(1),
(2) Date: Mar. 19, 2018

(87) PCT Pub. No.: WO2017/046805
PCT Pub. Date: Mar. 23, 2017

(65) Prior Publication Data
US 2019/0036946 A1 Jan. 31, 2019

Related U.S. Application Data

(60) Provisional application No. 62/219,695, filed on Sep. 17, 2015.

(51) Int. Cl.
*H04L 29/06* (2006.01)
*H04L 29/08* (2006.01)
(Continued)

(52) U.S. Cl.
CPC .......... *H04L 63/1408* (2013.01); *B60R 25/00* (2013.01); *G06F 21/55* (2013.01);
(Continued)

(58) Field of Classification Search
CPC ............. H04L 63/1408; H04L 63/0227; H04L 63/123; H04L 67/12; H04L 29/06;
(Continued)

(56) References Cited

U.S. PATENT DOCUMENTS

| 7,997,737 B2 | 8/2011 | Itoh et al. |
| 9,342,695 B2 | 5/2016 | Barkan |

(Continued)

FOREIGN PATENT DOCUMENTS

| WO | 2014061021 | 4/2014 |
| WO | WO 2014/061021 | 4/2014 |

(Continued)

OTHER PUBLICATIONS

International Search Report and the Written Opinion dated Jan. 3, 2017 From the International Searching Authority Re. Application No. PCT/IL2016/051033. (10 Pages).

(Continued)

*Primary Examiner* — Jayesh M Jhaveri
(74) *Attorney, Agent, or Firm* — McCoy Russell LLP

(57) ABSTRACT

There is provided a method for identifying malicious activity that changes the integrity of data sent out from a vehicle, comprising: intercepting, by an output data monitoring agent that monitors data sent out from the vehicle to an external receiving computing unit using a communication interface in communication with a network; intercepting, by at least one sensor data monitoring agent that monitors sensor data outputted by at least one sensor associated with the vehicle; monitoring the integrity of the data sent out by the vehicle by analyzing the data collected by the output data monitor-
(Continued)

ing agent with the sensor data collected by the at least one sensor data monitoring agent to identify a mismatch; and identifying an indication of malicious activity that changed the data sent out from the vehicle relative to the data sensed by the at least one sensor.

20 Claims, 7 Drawing Sheets

(51) Int. Cl.
| | |
|---|---|
| *H04W 4/44* | (2018.01) |
| *H04W 12/12* | (2009.01) |
| *H04W 12/00* | (2009.01) |
| *H04W 12/10* | (2009.01) |
| *G06F 21/55* | (2013.01) |
| *G06F 21/64* | (2013.01) |
| *B60R 25/00* | (2013.01) |
| *H04W 4/70* | (2018.01) |

(52) U.S. Cl.
CPC ............ *G06F 21/554* (2013.01); *G06F 21/64* (2013.01); *H04L 63/0227* (2013.01); *H04L 63/123* (2013.01); *H04L 67/12* (2013.01); *H04W 4/44* (2018.02); *H04W 12/009* (2019.01); *H04W 12/10* (2013.01); *H04W 12/1208* (2019.01); *B60R 2325/40* (2013.01); *H04W 4/70* (2018.02)

(58) Field of Classification Search
CPC ...... H04L 29/08; H04W 4/44; H04W 12/009; H04W 12/1208; H04W 12/10; H04W 4/70; H04W 12/12; H04W 12/00; G06F 21/55; G06F 21/554; G06F 21/64
See application file for complete search history.

(56) References Cited

U.S. PATENT DOCUMENTS

| | | | |
|---|---|---|---|
| 9,525,700 B1* | 12/2016 | Malinowski | ........ H04L 63/1408 |
| 9,813,436 B2* | 11/2017 | Moeller | ............... H04W 4/029 |
| 2013/0212659 A1* | 8/2013 | Maher | ..................... H04W 4/44 |
| | | | 726/6 |
| 2015/0067864 A1* | 3/2015 | Barkan | ................... G06F 21/57 |
| | | | 726/24 |
| 2015/0113638 A1 | 4/2015 | Valasek et al. | |
| 2015/0195297 A1* | 7/2015 | Ben Noon | ............ B60R 16/023 |
| | | | 726/22 |
| 2017/0214701 A1* | 7/2017 | Hasan | ................. H04L 63/1408 |

FOREIGN PATENT DOCUMENTS

| | | |
|---|---|---|
| WO | 2015057979 | 4/2015 |
| WO | WO 2015/057979 | 4/2015 |
| WO | WO 2017/046805 | 3/2017 |

OTHER PUBLICATIONS

International Preliminary Report on Patentability dated Mar. 29, 2018 From the International Bureau of WIPO Re. Application No. PCT/IL2016/051033. (6 Pages).

Supplementary European Search Report and the European Search Opinion dated Apr. 11, 2019 From the European Patent Office Re. Application No. 16845845.3. (7 Pages).

\* cited by examiner

SYSTEMS AND METHODS FOR DETECTION OF MALICIOUS ACTIVITY IN VEHICLE DATA COMMUNICATION NETWORKS

CROSS-REFERENCE TO RELATED APPLICATIONS

This application claims priority to and is the National Stage filing of International Application No. PCT/IL2016/051033, titled SYSTEMS AND METHODS FOR DETECTION OF MALICIOUS ACTIVITY IN VEHICLE DATA COMMUNICATION NETWORKS filed on Sep. 18, 2016, which claims the benefit of priority under 35 USC § 119(e) of U.S. Provisional Patent Application No. 62/219,695 filed Sep. 17, 2015, the contents of which are incorporated herein by reference in their entirety.

BACKGROUND

The present invention, in some embodiments thereof, relates to vehicle data communication networks and, more specifically, but not exclusively, to systems and methods for detecting malicious activity in vehicle data communication networks.

A connected car is a road vehicle equipped with one or more sets of communications systems: Internet access, an internal network, and wireless communication capabilities, which enable the car to route its connection access (sometimes referred to as vehicle-to-Internet, or V2I) to other devices that are installed inside—and possibly outside—of the vehicle. Alongside these typically there is the controller area network (CAN) bus (or similar) used to interconnect the gamut of electronic control units (ECUs), sensors and actuators that form part of a vehicle's inner electronic workings. Increasingly, such cars are fitted with specific technologies that link into the Internet access or internal network to provide additional driver benefits: automatic notification of collisions, notification of excessive speeding, and other safety alerts, for example. There are two additional communications types that may supplement these: a vehicle-to-vehicle (V2V) technology that enables cars to communicate wirelessly and even maintain temporary networks between vehicles that can inform accident prevention, road hazards, and other driving intelligence; and Internet of Things (Vehicle-to-IoT or V2IoT), as a connected entity receiving data from external sources, and sharing data that it captures with remote third-parties for specific applications (traffic flow updates, for example).

While traditional safety and security telematics services such as eCall, bCall, stolen vehicle tracking, and remote diagnostics continue to roll out across the globe, focus is now starting to shift from the physical protection of vehicles, drivers and passengers to the security protection against cyber-attacks and intrusions, which, in turn could threaten the physical integrity of persons and the data that is transmitted for a vehicle. Security is expected to become ever more critical, dominating safety and security telematics. Security becomes an even bigger concern with autonomous vehicles, and even more so with driverless cars, in which software and connectivity plays a much bigger and more critical role for the safe driving of vehicles. The one- and two-way electronic communications systems that road vehicles have increasingly been equipped with over recent decades, such as radio receivers and transmitters, have been augmented by links to cellular voice/data devices and to satellite signals. In-vehicle infotainment networks, and the notion of cars-hot-spot, have been introduced by automotive OEMs (original equipment manufacturers) variously in recent years. These typically co-exist with the automotive control networks that enable the transit and exchange of data relating to the operation of the vehicle itself. The importance of identifying potential vulnerabilities or flaws in a connected car's communications and data systems that could be exploited by somebody seeking to hack into that vehicle's control mechanisms or other onboard technology and protecting such vehicles against interference or attack, has stepped up in the last five years, as cyberattack threats have become potentially more hazardous, and more aggressive.

An article Experimental Security Analysis of a Modern Automobile (2010) experimentally demonstrated that an informed attacker who is able to infiltrate ECUs can circumvent a broad array of safety critical systems. The article Comprehensive Experimental Analyses of Automotive Attack Surfaces (2011) proposes that remote exploitation of connected vehicles is feasible via a broad range of attack vectors (including mechanics tools, compact disc players, Bluetooth links, and cellular radio); and further, that wireless communications channels can allow remote vehicle control, location tracking, in-cabin audio 'exfiltration', and vehicle theft. The foreseeable exploits of the vehicle data integrity might lead to data theft, such as: online automotive apps and services that contain banking/credit records; congestion charge or toll payment information; general personal identification data; insurance and tax data—useful for identity theft; license plates and other vehicle registration data; vehicle location information; vehicle physical security data; extortion/denial-of-service threat; fraud and deception (altering or deleting schedule logs and records); freight and goods theft (activating false alarms that cause goods to be left unattended); immobilization; premises security and burglary—vehicle data that reveals businesses and homes are unoccupied and many others.

U.S. Pat. No. 7,797,737, Security for network-connected vehicles and other network-connected processing environments, appears to relate to a method and apparatus that provide security for a network-connected vehicle (or other networked environment) in which a predefined set of permitted operations relating to protected resources can be initiated remotely from elsewhere in the network, while security is maintained for the protected resources (for example, an engine performance optimization control unit or air conditioning control unit within a vehicle) by preventing remote initiation of any other operations on a data processing unit which is connected to the protected resources.

U.S. Patent Application 2013/0212659, Trusted connected vehicle systems and methods, appears to relate to systems and methods for facilitating a security and trust architecture in connected vehicles. In certain embodiments, a method for creating a trusted architecture in a connected vehicle may include generating a connected vehicle ecosystem map including information relating to a plurality of electronic control units and network connections included in the connected vehicle. Based on the vehicle ecosystem map, trusted relationships involving electronic control units may be identified. Trusted credentials may be generated and issued to electronic control units that meet one or more trust requirements. Using the trusted credentials, trusted communication within the connected vehicle may be achieved.

SUMMARY

According to an aspect of some embodiments of the present invention there is provided a computer implemented method for identifying an indication of malicious activity that changes the integrity of data sent out from a vehicle, comprising: intercepting, by an output data monitoring agent that monitors data sent out from the vehicle to an external receiving computing unit using a communication interface in communication with a network; intercepting, by at least one sensor data monitoring agent that monitors sensor data outputted by at least one sensor associated with the vehicle; wherein the data sent out from the vehicle is based on the sensor data, wherein the data sent out from the vehicle is intercepted by the output data monitoring agent prior to being processed by the receiving computing unit; monitoring the integrity of the data sent out by the vehicle by analyzing the data collected by the output data monitoring agent with the sensor data collected by the at least one sensor data monitoring agent to identify a mismatch; identifying an indication of malicious activity that changed the data sent out from the vehicle relative to the data sensed by the at least one sensor; and providing an output message indicative of the malicious activity.

Optionally, the output monitoring agent is executed on a server located externally to the vehicle, wherein the server comprises the receiving computing unit.

Optionally, the output monitoring agent is executed on a computing unit located within the vehicle.

Optionally, the communication interface comprises a wireless transmitter, and wherein the output monitoring agent monitors the wireless transmitter of the vehicle that transmits the data sent out from the vehicle to the receiving computing unit.

Optionally, the at least one sensor data monitoring agent sniffs at least one network of the vehicle. Optionally, the at least one network installed in the vehicle includes one or more members selected from the group consisting of: canvas, can-fd, flexray, Ethernet.

Optionally, the at least one sensor data monitoring agent collects data from the transmission control unit (TCU) of the vehicle.

Optionally, the at least one sensor data monitoring agent directly monitors output of the at least one sensor using a splitter.

Optionally, the at least one sensor data monitoring agent monitors data transmitted over the electronic control unit (ECU) of the vehicle.

Optionally, the at least one sensor data monitoring receives low level data, and the output data monitoring agent receives high level data, and the analyzing is performed by code that converts the low level data to higher level data for analysis with the high level data. Optionally, the low level data comprises analogue signals measured by the at least one sensor and the higher level data comprises at least one numerical value computed from the analogue signals.

Optionally, the monitoring of the integrity of the data is performed dynamically as the data is sensed by the at least one sensor.

Optionally, the data sent out from the vehicle is selected from the group consisting of: insurance data, safety data, car payment systems, driver authentication data.

According to an aspect of some embodiments of the present invention there is provided a computing unit for identifying an indication of malicious activity that changes the integrity of data sent out from a vehicle, comprising: a program store storing code; and a processor coupled to the program store for implementing the stored code, the code comprising: code to intercept, by an output data monitoring agent that monitors data sent out from the vehicle to an external receiving computing unit using a communication interface in communication with a network; code to intercept, by at least one sensor data monitoring agent that monitors sensor data outputted by at least one sensor associated with the vehicle; wherein the data sent out from the vehicle is based on the sensor data, wherein the data sent out from the vehicle is intercepted by the output data monitoring agent prior to being processed by the receiving computing unit; and code to monitor the integrity of the data sent out by the vehicle by analyzing the data collected by the output data monitoring agent with the sensor data collected by the at least one sensor data monitoring agent to identify a mismatch, identify an indication of malicious activity that changed the data sent out from the vehicle relative to the data sensed by the at least one sensor; and provide an output message indicative of the malicious activity.

Optionally, the computing unit is implemented as a server located externally to the vehicle, wherein the server receives the data sent out from the vehicle and the data sensed by at least one sensor, over the network that provides communication between the server and the vehicle. Optionally, the server is in communication with a second server of a third party that receives the data sent out from the vehicle, wherein the second server of the third party provides the data sent out from the vehicle to the server, wherein the data sensed by at least one sensor is transmitted by the vehicle to the server.

Optionally, the computing unit is installed within the vehicle to monitor the integrity of the data sent out by the vehicle to a server located externally to the vehicle.

Optionally, the at least one sensor data includes raw signals sensed by the at least one sensor and the data sent out by the vehicle includes data created by processing the raw signals.

According to an aspect of some embodiments of the present invention there is provided a computer program product comprising a non-transitory computer readable storage medium storing program code thereon for implementation by at least one processor of a computing unit, for detecting an indication of malicious activity that changes the integrity of data sent out from a vehicle, comprising: program instructions to intercept, by an output data monitoring agent that monitors data sent out from the vehicle to an external receiving computing unit using a communication interface in communication with a network; program instructions to intercept, by at least one senor data monitoring agent that monitors sensor data outputted by at least one sensor associated with the vehicle; wherein the data sent out from the vehicle is based on the sensor data, wherein the data sent out from the vehicle is intercepted by the output data monitoring agent prior to being processed by the receiving computing unit; program instructions to monitor the integrity of the data sent out by the vehicle by analyzing the data collected by the output data monitoring agent with the sensor data collected by the at least one sensor data monitoring agent to identify a mismatch; program instructions to identify an indication of malicious activity that changed the data sent out from the vehicle relative to the data sensed by the at least one sensor; and program instructions to provide an output message indicative of the malicious activity.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE PREFERRED EMBODIMENTS

Figure 1A:
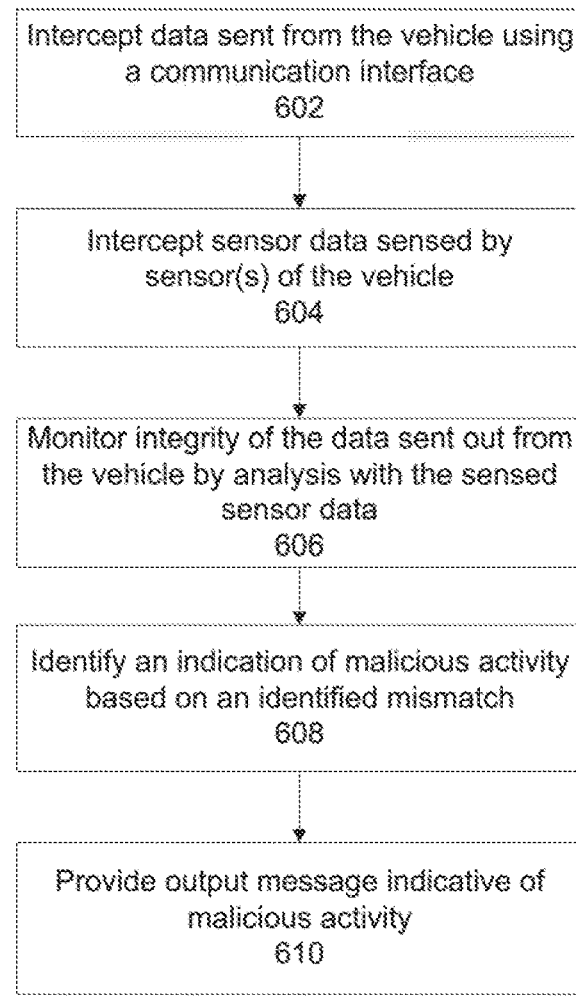
FIG. 1A is a flowchart of a method for monitoring the integrity of data sent out from a vehicle to identify an indication of malicious activity that changes the data sent out from the vehicle, in accordance with some embodiments of the present invention.

The present invention, in some embodiments thereof, relates to vehicle data communication networks and, more specifically, but not exclusively, to systems and methods for detecting malicious activity in vehicle data communication networks.

An aspect of some embodiments of the present invention relates to systems and/or methods (e.g., code instructions stored in a data storage executed by one or more processors) that monitor the integrity of data sent out from a vehicle. Data with compromised integrity is indicative of possible malicious activity that changes the data sent out from the vehicle. The data sent out from the vehicle is based on data measured by one or more sensors associated with the vehicle. The malicious activity is detected (or highly suspected) based on a mismatch detected by correlating between data outputted by sensor(s) associated with the vehicle (collected by one or more sensor data monitoring agents) and data sent out by the vehicle (collected by an output data monitoring agent that monitors data at a receiving computing unit). The sensor data represents raw data outputted by the sensors, which is indicative of the real data, which is assumed to be unaltered by malicious activity. The data sent out by the vehicle may have been tampered with by malicious activity (e.g., manually by a malicious entity, and/or automatically by malicious code). Integrity of the sensor data is compromised when the data sent out by the vehicle does not match the raw (i.e., real) data, for example, according to a correlation requirement.

The systems and/or methods described herein may monitor the integrity of data, for example, insurance data, safety data, car payment systems (e.g., toll roads, fuel, parking), and authentication of the driver (e.g., to prevent fraud by unauthorized drivers).

The sensor data may be collected (e.g., intercepted, sniffed, received) from the sensor itself (e.g., using a splitter located at the sensor, at a network installed in the vehicle, and/or at a data processing unit (e.g., ECU) of the vehicle. The data sent out by the vehicle (which is transmitted to an external receiving computing device) may be collected at the vehicle (e.g., at the transmitter that transmits the data from the vehicle to the external receiving computing device), and/or collected at the external receiving computing device (e.g., server), and/or at intermediate locations thereof. The data sent out by the vehicle is collected prior to processing of the data by the external receiving computing device.

Optionally, the malicious activity is detected at the vehicle itself, by code instructions that perform the correlation of the sensor data with the data sent out by the vehicle. Alternatively or additionally, the malicious activity is detected at a server external to the vehicle, by code instructions that perform the correlation of the sensor data (transmitted by the vehicle to the server) with the data sent out by the vehicle to the server and/or to a third party server that forwards the data sent out by the vehicle to the server.

Optionally, the sensor data represents low level data, for example, analogue signals outputted by the sensors. The data sent out by the vehicle represents high level data computed from the analogue signals, for example, by conversion to digital format and processing of the signals to compute one or more values. For example, the analogue signals are senses by brake sensors denoting pressure of the applied breaks, and the data sent out by the vehicle includes a numerical value representing the applied pressure. The correlation maybe performed by converting the low level data to a higher level for correlation with the high level data outputted by the vehicle.

Alternatively or additionally, the data sent out by the vehicle is computed and/or aggregated from data outputted by multiple sensors. The correlation may be performed by computing and/or aggregating the data from the multiple sensors to a format of the data sent out by the vehicle.

An aspect of some embodiments of the present invention relates to a server and/or a method executed by the server (e.g., as code instructions stored in a data storage executed by one or more processors of the server) that receives (using a wireless network connection and/or a wired connection) sensor data from a computing unit installed in a vehicle. The sensor data is collected from one or more sensors that measure one or more parameters of the vehicle. The server analyzes the sensor data to identify the presence of malicious activity within the computing unit of the vehicle. The server architecture provides centralized monitoring of the integrity of computing units of multiple vehicles.

Optionally, the analysis is performed based on a comparison between the sensor data received from the computing unit of the vehicle, and sensor data designated as normal operation received from other vehicles. Deviation from normal (e.g., according to a statistical correlation requirement, and/or as computed by a statistical classifier) is indicative of the presence of malicious activity. The server architecture collects data from other vehicles, to create the sensor data designated as normal. The data from other vehicles may be categorizes for correlation with the received sensor data, for example, based on vehicle manufacturer, sensor types, and geographical location. Data designated as normal operation collected from a large number of vehicles may improve the ability to correctly identify the malicious activity.

Optionally, when the malicious activity is identified, the associated sensor data is tagged with a tag indicative of the association with malicious activity. The sensor data and the tag may be stored by the server and used to update a statistical classifier (or other code) to detect the presence of similar malicious activity in the computing unit of another vehicle.

An aspect of some embodiments of the present invention relates to a computing unit installed in a vehicle and/or a method executed by the computing unit (e.g., as code instructions stored in a data storage executed by one or more processors of the computing unit) that receives sensor data from one or more sensors associated with the vehicle that measure one or more parameters of the vehicle. The sensor data is wirelessly transmitted and/or transmitted over a cable, over a network to a server. The server responds with an indication of the presence of malicious activity operating within the computing unit of the vehicle.

The systems and/or methods (e.g., code instructions stored in a data storage device executable by one or more processors) described herein relate to the technical problem of security a data communication network within a road based vehicle (e.g., car, truck) against malicious activity. The systems and/or methods (e.g., code instructions stored in a data storage device executable by one or more processors) described herein improve an underlying process within the technical field of network security, in particular, within the technical field of security of networks installed within vehicles.

The systems and/or methods (e.g., code instructions stored in a data storage device executable by one or more processors) described herein are directed towards detection of malicious activity (e.g., malicious code attempting to install itself within the network, malicious code attempting to access the network, and/or manual malicious activity performed by a human) within the vehicle network. The detection of the malicious activity helps maintain a sanitized vehicle network. Detection of malicious activity is a concept inextricably tied to computer technology and/or network technology.

The systems and/or methods (e.g., code instructions stored in a data storage device executable by one or more processors) described herein improve performance of the computing unit installed in the car (e.g., improvement in processor and/or memory utilization) and/or the data communication network installed in the car (e.g., improvement in network performance, and/or available bandwidth). The improvement in performance results by maintenance of the sanitized network and/or sanitized computing unit. Computing unit(s) and/or network(s) adversely affected by malicious activity may experience degradation in processor performance, reduced available memory, degradation in network performance and/or available network bandwidth.

The systems and/or methods (e.g., code instructions stored in a data storage device executable by one or more processors) described herein improve performance of the vehicle itself, by maintaining a sanitized network not adversely affected by malicious activity. The vehicle with the sanitized network is able to perform correctly, providing features as designed, for example, safety features, and/or road navigation features. Vehicles adversely affected by malicious activity may malfunction, potentially resulting in vehicle failure, accidents, and navigation errors.

The systems and/or methods (e.g., code instructions stored in a data storage device executable by one or more processors) described herein are tied to physical real-life components, including physical sensors that perform measurements on one or more parameters of the car, for example, passive safety sensors, active safety sensors, integrated safety sensors, and authentication sensors.

The systems and/or methods described herein provide a unique, particular, and advanced technique of collecting and analyzing data dynamically from multiple sensors installed in the vehicle, to identify the presence of malicious activity within the vehicle network.

Accordingly, the systems and/or methods described herein are inextricably tied to a network environment and/or to computer technology, to overcome an actual technical problem arising in networks installed within vehicles.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term malicious activity may refer to automatic malicious activity performed by malicious code, and/or manual malicious actions performed by a human (e.g., hacker, thief, terrorist). Examples of malicious code include viruses, worms, Trojan horse, spyware, adware, cryptoware, and ransomware. Malicious code may be installed as executable code, a script, an application, a file, by injection, by manual coding, and/or other methods. Examples of manual malicious actions include manual tampering with existing data, installation of forged or fake data instead of real recorded sensor data, and installation of the malicious code.

As used herein, the terms data integrity and malicious activity and malicious code are sometimes interchanged, for example, the detection of malicious activity (which may be caused by malicious code) may be performed based on detection of modification of data integrity. In another example, the most common reason for modification of data integrity is assumed to be due to malicious activity (which may be caused by malicious code), since quality control checks are assumed to have been performed to verify the data integrity before release to users.

As used herein, the term network sometimes means the network installed in the vehicle. The network may include components such as a computing unit, processor(s), memory, code instructions, sensors, and other hardware and/or software components that may be affected by malicious activity. As referred to herein, detection of malicious activity in the network may refer to detection of malicious activity in the hardware and/or software components installed in the vehicle.

As used herein, the term computing unit may include the network installed in the vehicle, and/or other hardware and/or software components installed in the vehicle. The computing unit may represent the storage device storing the code instructions of the sensor data monitoring agent and/or the output data monitoring agent, and the processor(s) that execute the code instructions. As referred to herein, detection of malicious activity in the computing unit may refer to detection of malicious activity in the network and/or hardware and/or software components installed in the vehicle.

Figure 1B:
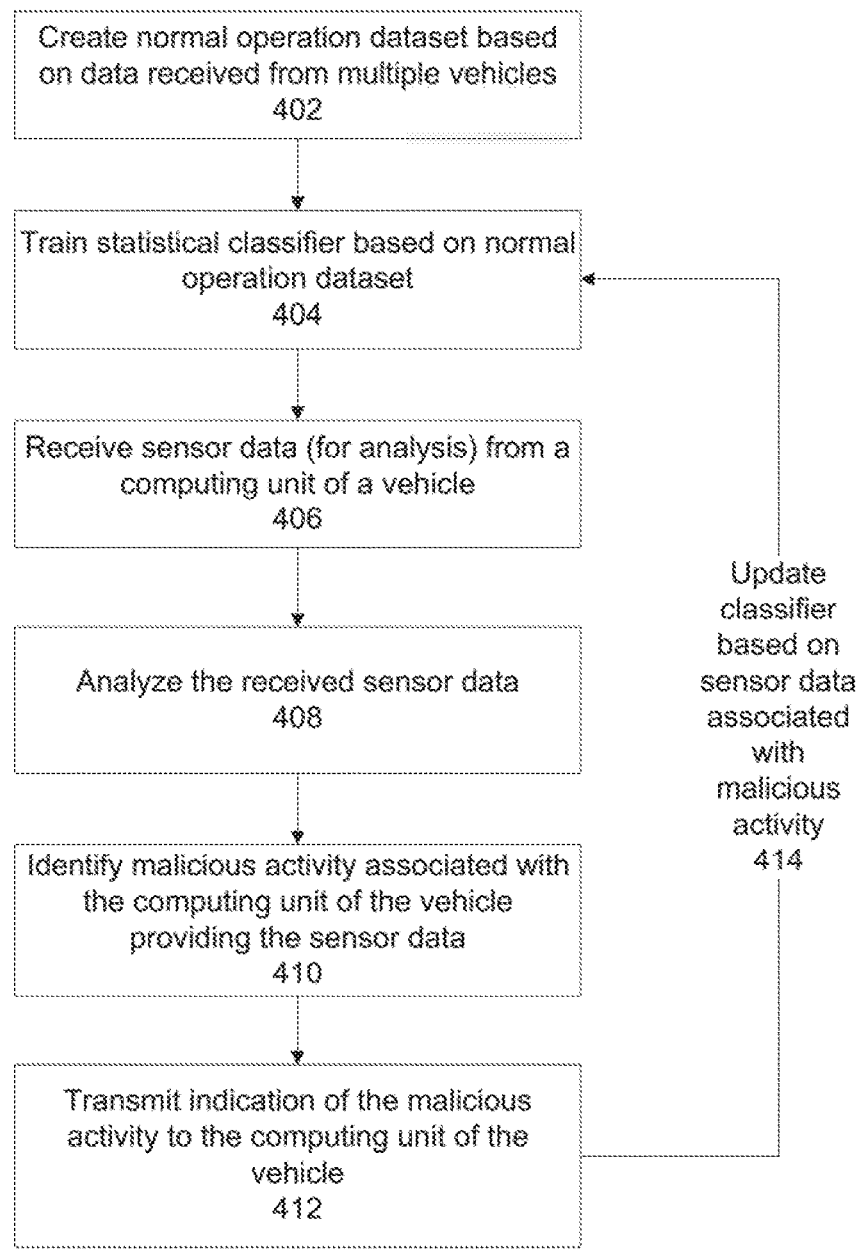
FIG. 1B is a flowchart of a method for identification of malicious activity within one or more computing unit components (e.g., network) installed in a vehicle from the perspective of the server, in accordance with some embodiments of the presence invention.
Figure 1C:
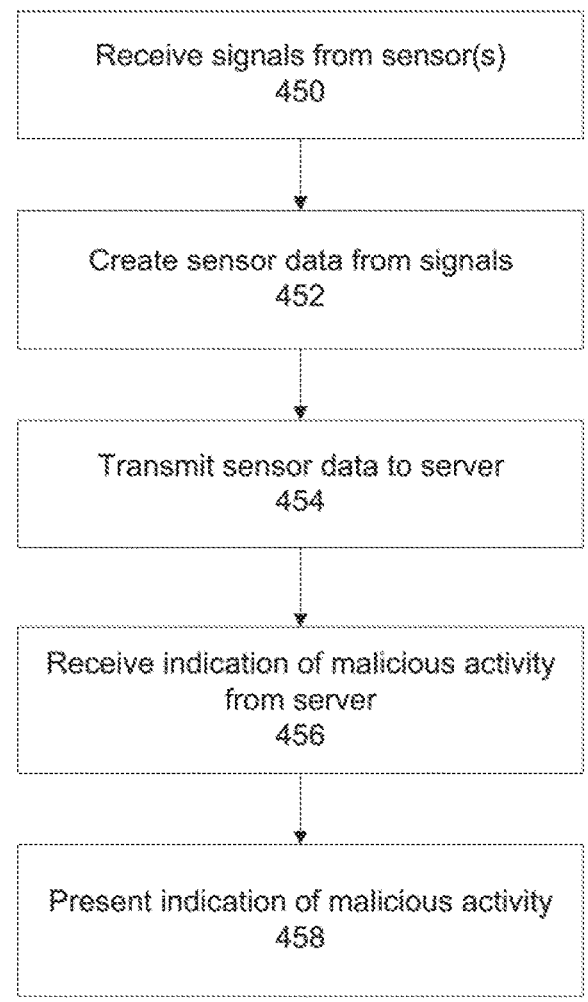
FIG. 1C is a flowchart of a method for identification of malicious activity within one or more computing unit components installed in the vehicle from the perspective of the computing unit, in accordance with some embodiments of the presence invention.
Figure 2:
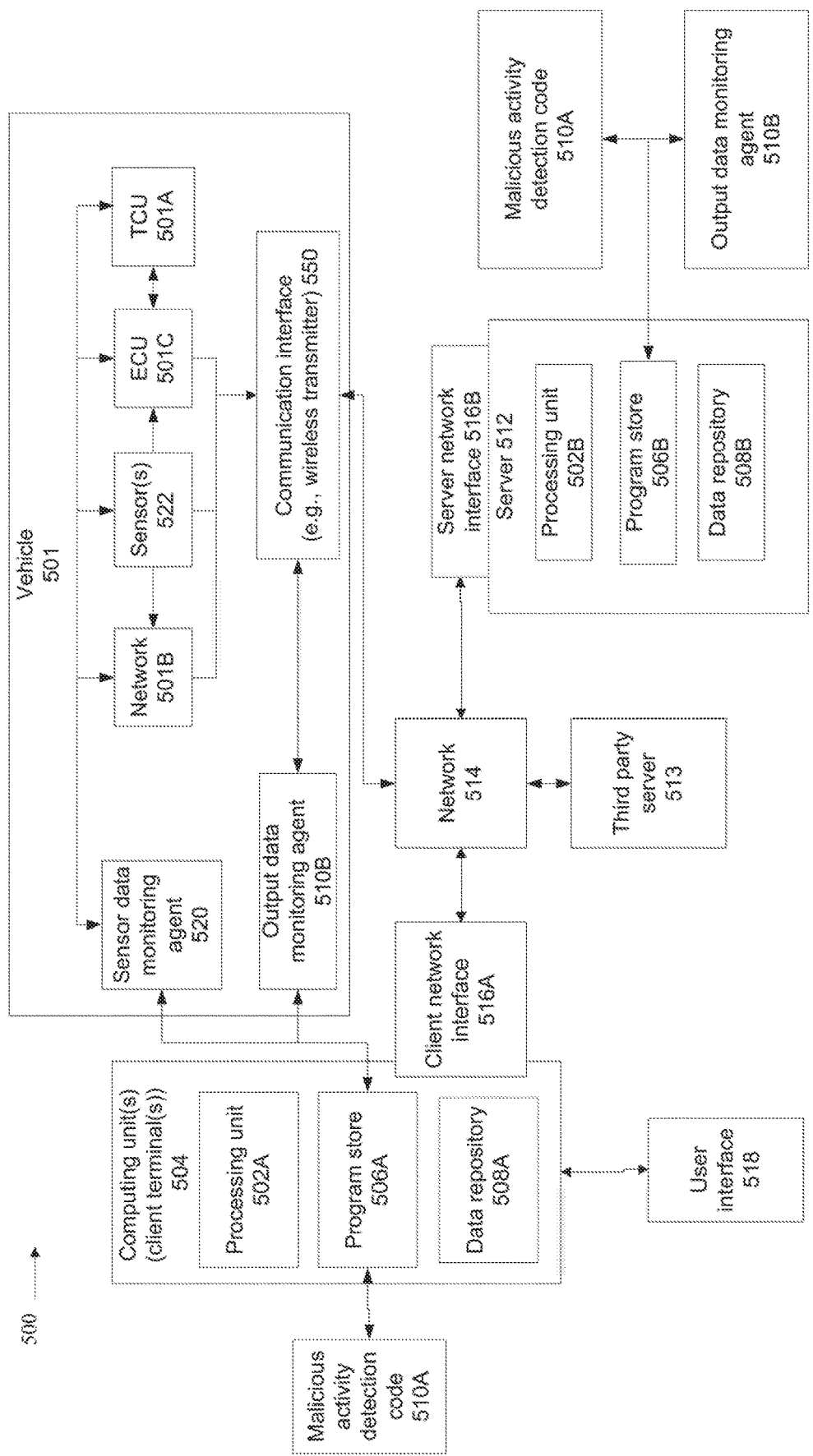
FIG. 2 is a block diagram of a system that includes a server that identifies malicious activity within a computing unit component a vehicle, in accordance with some embodiments of the present invention.

The terms computing unit and data communication network may sometimes be interchanged when referring to the hardware and/or software components installed in the vehicle that are being monitored for the presence of malicious activity Reference is now made to FIG. 1A-C, which are flowcharts of methods for identification of malicious activity executing within a network installed in a vehicle, in accordance with some embodiments of the presence invention. FIG. 1A describes one exemplary method. FIGS. 1B-C describe another exemplary method, where FIG. 1B is from the vantage point of a server, and FIG. 1C is from the vantage point of the vehicle. Reference is also made to FIG. 2, which is a block diagram of a system 500 that includes a server 512 and/or computing unit 504 that detect malicious activity within a network 501B of a vehicle 501, in accordance with some embodiments of the present invention. System 500 may implement the acts of the method of FIG. 1A-C, for example, by processing unit 502A of computing unit 504A executing code instructions (optionally, malicious activity detection code 510A as described herein) stored in a program store 506A, and/or by processing unit 502B of server 512 executed code instructions (optionally, malicious activity detection code 510A as described herein) stored in a program store 506B. It is noted that in another implementation, one or more functions performed by computing unit 504 may be stored in data repository 508A for execution by processing unit 502A of computing unit 504. In yet another implementation, one or more functions described with reference to FIG. 1A-C may be performed by server 512, for example, by processing unit 502B of server 512 executing code instructions (optionally, malicious activity detection code 510A) stored in a program store 506B and/or data repository 508B.

Computing unit (also referred to herein as client terminal) 504 may be installed within a vehicle 501, optionally a road based vehicle, for example, a car, a truck, a van, a minivan, and a bus. The vehicle may be an autonomously driven vehicle, a manually driven vehicle, or a semi-autonomous semi-manual driven vehicle. Computing unit 504 may be implemented, for example, as hardware installed in the car, as software installed on an existing computing device, and/or a portable computing unit that may be used for other purposes, for example, a mobile device (e.g., Smartphone, table computer, laptop computer, glasses computer, and watch computer).

Alternatively, computing unit 504 is implemented as a server. Server 512 described herein may executed one or more functions described herein with reference to computing unit 504.

Vehicle 501 may include one or more computing components:

A transmission control unit (TCU) that controls the transmission of the vehicle according to data outputted by sensor(s) 522.

One or more networks 501B that connect different electronic and/or computing components within the vehicle, and/or that connect computing components of the vehicle to externally located computing devices (e.g., using a wireless connection and/or wired connection). Exemplary networks include: canvas, can-fd, flexray, and Ethernet.

An electronic control unit (ECU) 501U of the vehicle that controls one or more of the electrical system or subsystems in the vehicle.

One or more communication interfaces 550, optionally a wireless transmitter(s) (e.g., antenna(s) which may also act as receivers) and/or a wired connection that transmit the data sent out by vehicle 501 to a receiving computing unit, for example, a third party server 513 (e.g., a server of an insurance company, a server of the manufacturer). Communication interface(s) 550 may include a software communication interface (e.g., virtual interface) and/or a hardware communication interface (e.g., network interface card, network interface cable connection, antenna).

Sensor data monitoring agent 520 (e.g., code instructions stored in a program store executed by one or more processors) may monitor the data outputted by sensor(s) 522, by one or more of: a splitter (or other component) to receive the data outputted by sensor(s) 522, at network(s) 501B, at TCU 501A, and/or at ECU 501C. Network 501B, TCU 501A, and/or ECU 501C may be monitored, for example, by packet sniffing code that monitors packets, network sniffing code that monitors network traffic, packet and/or network analyzer code that analyzes transmitted data, and/or other methods. The interception and/or analysis may be performed using software and/or hardware components.

Output data monitoring agent 510B (e.g., code instructions stored in a program store executed by one or more processors) may monitor the data sent out by vehicle 501 to the receiving computing unit, at the vehicle itself (e.g., at communication interface 550) and/or at the receiving computing unit (e.g., at third party server 513).

The correlation between the data outputted by the sensor(s) and the data sent out by the vehicle may be performed by malicious activity detection code 510A (e.g., code instructions stored in a program store executed by one or more processors) executed at the vehicle (e.g., in computing unit 504 installed in vehicle 501) and/or at server 512, and/or at other computing devices.

Computing unit 504 may be in communication with sensor data monitoring agent 520 that senses the data received from sensor(s) 522 installed in vehicle 501. The sensors may be installed within the car, or externally to the car (e.g., installed in another car, installed at the side of the road). Data from externally installed sensors may be received, for example, over a wireless communication link and/or a wired (e.g., cable) connection. Exemplary sensor(s) 522 include:

Sensors associated with the driving system, for example, transmission sensors, speed sensors, brake sensors, and gas level sensors.

Sensors associated with the driver and/or cabin, for example, fatigue sensors, eye monitoring sensors, cabin temperature sensors, blood pressure of the driver.

Sensors associated with the environment around the vehicle, externally to the vehicle, for example, camera that captures still images and/or videos of the environment outside of the vehicle, and/or image processing sensors that analyze images to identify events outside of the vehicle (e.g., lane deviation sensor, proximity sensor to another vehicle, speed sign sensor, and traffic light sensor).

Quantified self sensor(s) that measure biometrics of the driver (and/or passengers), for example, electroencephalogram (EEG), electrocardiogram (ECG), blood pressure, blood glucose level, heart rate, fatigue level, and attention level.

Passive safety sensor(s) that measure one or more parameters independently of actions taken by the driver. Exemplary passive safety sensors include: airbag sensors that sense the state of the airbag (e.g., deployed or not), seat belt sensors that sense the state of the seat belt (e.g., buckled or unbuckled), steering wheel sensors that measure the movement of the steering wheel (e.g., left turn, right turn), vision sensors that measure the visibility of the road (e.g., clear, fog, day, night), fatigue detection sensors that measure the fatigue level of the driver (e.g., alert, tired, sleeping), pedestrian recognition sensors that detect whether a pedestrian is crossing the street or not, and tire pressure monitoring sensors that measure the state of the tire pressure (e.g., inflated, not sufficiently inflated, pressure level).

Active safety sensor(s) that measure one or more parameters based on actions taken by the driver. Exemplary active safety sensors include: brake sensors that sense whether the driver is braking or not, driver assist sensors that measure driving parameters (e.g., speed, lane divider, distance to other cars), steering control sensors that measure the steering by the driver (e.g., following the lane or not, sharp turns, distance to other cars), linkage and suspension sensors that measure suspension activation (e.g., driving over speed bump too fast, driving too fast on dirt road).

Integrated safety sensor(s) that measure a combination of parameters associated with road safety. Exemplary integrated safety sensors include: pre-crash emergency brake sensors that measure breaking patterns before a crash, lane departure warning sensors that detect whether the driver is about to move into the oncoming lane, park assist sensors that help the driver park the car correctly within the spot and/or without hitting another car, roll over protection sensor that measure motion of the car to help prevent rolling over, and collision warning sensor that measure parameters indicative of an upcoming collision with another car or an object.

Vehicle user authentication sensor(s) that determine whether the user is authorized to drive the vehicle. Exemplary vehicle user authentication sensors include: keyless authentication sensors that authenticate the user and provide keyless access to the vehicle, battery consumption sensors that measure the battery consumption when the vehicle is driven by the user, gas consumption sensors that measure the gas consumption when the vehicle is driven by the user, vehicle life cycle sensors that measure whether the vehicle driven by the user is being maintained according to the maintenance schedule, DYIdiagnostics sensors, DYImaintenance sensors, build-in transaction sensors, and blockchain-related sensors.

Server 512 may be implemented, for example, as a central server, a computing cloud, a network server, a web server, as a stand-alone unit, as code installed on an existing computer, as a hardware card inserted into an existing computer, or other implementations. Server 512 may be implemented as a hardware component (e.g., standalone computing unit), as a software component (e.g., implemented within an existing computing unit), and/or as a hardware component inserted into an existing computing unit (e.g., plug-in card, attachable unit). Server 512 may provide services to one or more computing units 504 (acting as client terminals) by providing software as a service (SAAS), providing an application installed on computing units 504 that communicates with server 512, and/or providing functions using remote access sessions.

Computing unit 504 communicates with server 512 over a network(s) 514 using respective client network interface 516A and server network interface 516B. Exemplary network 514 include: the internet, a local area network, a wide area network, a wireless network, a cellular network, a short range temporary network, and a local area network. Network interface 516 may include one or more antennas and/or transceivers providing wireless network communication, and physical and/or virtual network connections, for example, network interface card(s) and/or software network interfaces. Network interface 516 may be installed within the car itself, and/or exist as an external component used for other purposes, for example, the wireless network interface of a mobile device of the user.

Optionally, vehicle 501 sends data to a third party server 513 over network 514. For example, vehicle 501 may send out the data to server 513 of an insurance company that requires insured vehicles to transmit safety data. Third party server 513 may provide the data received from vehicle 501 to server 512 for detection of malicious activity in vehicle 501, as described herein.

Processing units 502A and/or 502B may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processing unit(s) 502A and/or 502B may include one or more processors (homogenous or heterogeneous), which may be arranged for parallel processing, as clusters and/or as one or more multi core processing units, for example, distributed across multiple virtual and/or physical servers, for example, located within a computing cloud and/or at multiple network connected processing nodes.

Program stores 506A and/or 506B store code instructions implementable by respective processing units 502A and/or 502B, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Computing unit 504, and/or server(s) 512, may include respective data repositories 508A and/or 508B (e.g., memory, hard drive, optical disc, storage device, remote storage server, cloud server).

Computing unit 504 includes or is in communication with a user interface 518 (which may be integrated with a display, or be implemented as a separate device for example, as the user interface of the mobile device of the user), for example, a touchscreen, a keyboard, a mouse, and voice activated software using speakers and microphone.

Malicious activity detection code 510A may be stored and executed by computing unit(s) 504 and/or by server 512.

Referring now back to FIG. 1A, at 602, data sent out from the vehicle to the receiving computing unit (e.g., third party server 513) is intercepted.

Exemplary data sent out from the vehicle to the computing unit includes: insurance data, safety data, car payment systems, driver authentication data. The data sent out from the vehicle is computed from the sensor data collected by one or more sensors 522 installed in vehicle 501. The data sent out from the vehicle may be referred to herein as higher level data (representing a higher level of abstraction and/or computed values, and the sensor data may be referred to herein as low level data (representing a low level of abstraction based on actual signals measured by the sensor). For example, the insurance data may include parameters describing the driving performance of the driver, for example, whether speed limits are obeyed or not (e.g., using speed sensors and sign sensors), whether the driver stops fully at stop signs (e.g., using brake sensors and sign sensors), whether the driver drives too closely to other cars (e.g. using proximity sensors), and whether the driver stops at crosswalks to let pedestrians cross (e.g., using pedestrian sensors and road sensors). For example, safety data may be based on the safety status of the car, for example, pressure in tires (e.g., pressure sensor), whether seat belts are worn by passengers (e.g., seat belt sensor), and whether the car headlights are on at night (e.g., light sensor). Car payment systems include, for example, a transponder used to automatically bill the driver for tolls, a gas payment system used to automatically bill the driver for gas, and a vehicle payment system used to track whether the driver is paying off the car according to scheduled car payments. Driver authentication data may be used to detect who is driving the car, and whether they driver is authorized, for example, analyzing biometrics of the driver (e.g., face, voice, weight).

The vehicle may transmit the collected data to third party server 513 (e.g., an insurance server, a safety server, a server of the manufacturer), and/or to server 512 (for analysis to detect malicious activity) located externally to vehicle 501. Third party server 513 may forward the received data for analysis by server 512 to detect malicious activity.

The data set out by the vehicle is monitored by output monitoring agent (e.g. 510B) that executes in a location between where the data is generated by vehicle 501 and where the data is received by the server. The output monitoring agent may intercept data at communication interface 550 (e.g., wireless transmitter), within the receiving server (e.g., third party server 513), or at an intermediate location. The output monitoring agent may be installed for monitoring communication interface 550 the vehicle that transmits the collected data (e.g., to third party server 513).

The data sent out from the vehicle is based on data sensed by the sensor(s), for example, an aggregation and/or computation performed based on data sensed by multiple sensors, and/or value(s) computed from raw data sensed by the sensor(s), and/or digitally processed version of analogue signals recorded by the sensor(s).

The data sent out from the vehicle is intercepted by the output data monitoring agent prior to being processed by the receiving computing unit. For example the data may be further processed by an insurance server of the insurance company insuring the vehicle. The output data monitoring agent is arranged to collect the data sent out by the vehicle prior to being processed by the insurance server.

At 604, data sensed by sensor(s) 522 installed in vehicle 501 is intercepted by sensor data monitoring agent(s) 520 installed within the vehicle. The sensor data monitoring agent 520 may be installed to intercept the data outputted by sensor(s) 522 as the data is generated. The sensor data monitoring agent may directly monitor output of sensor(s) 522 using a splitter. Collecting data directly at the source, from the sensor(s) 522 may reduce the risk of malicious activity affecting the raw data.

Sensor data monitoring agent may sniff network(s) 501B of the vehicle, to intercept data received from sensor(s) 522, for example, received from the sensor interface. Collecting data at network(s) 510B may improve the efficiency of collecting data from multiple sensors 522 located throughout vehicle 501. Exemplary vehicle networks include: canvas, can-fd, flexray, and Ethernet.

Sensor data monitoring agent may monitor sensor data transmitted over the electronic control unit (ECU) 501C of the vehicle.

Sensor data monitoring agent may monitor sensor data used by TCU 501A to control the transmission of the vehicle.

At 606, the integrity of the data sent out by the vehicle is monitored by comparing the data collected by the output data monitoring agent to the sensor data monitoring agent to identify a mismatch. The mismatch is indicative of malicious activity, since the data sent out by the vehicle is expected to match the data collected by the output monitoring agent.

The correlation may be performed by computing unit 504 installed at vehicle 501, and/or computing unit 504 implemented within server 512. The sensor data may be transmitted by vehicle 501 to server 512 for analysis.

The correlation may be performed by computing unit 504 on the sensor data and data sent out by the vehicle that are stored in program store 506A (and/or in another storage location).

The correlation may be performed by converting the collected sensor data (optionally raw data) into a format suitable for correlation with the data sent out by the vehicle. For example, low level sensor data, for example, indicating a breaking pattern of the driver may be converted to higher level data, indicating whether the driver stopped fully at each stop sign.

The correlation may be performed by converting data from multiple sensors into a single set of data sent out by the vehicle. For example, data from multiple safety sensors of the car (e.g., tire pressure, seat belt sensor, lights on sensor, following speed limit sensor) may be converted into a binary indication of whether the car is safe or not. The single set of computed data may be compared to the data sent out by the vehicle.

The low level sensor data may include analogue signals measured by the sensor. The low level sensor data may be converted to higher level data using, for example, analogue to digital conversion and digital processing methods to compute one or more numerical (or binary, or other format) values computed from the analogue signals, for correlation with the data sent out.

The sensor data and the data sent out by the vehicle may be time stamped, to compare data generated at the same time. The sample sizes that are compared may be compared based on time, geography, and/or events (e.g., deployment of airbag).

The monitoring of the integrity of the data may be computed dynamically as the data is sensed by the sensor and/or sent out by the vehicle. Alternatively or additionally, the monitoring of the integrity of the data may be computed periodically at predefined intervals and/or triggered by events, for example, once a day, once a week, during an accident, or for evaluation of insurance coverage.

The correlation may be performed, for example, by a correlation function that compares data (e.g., analogue signals, digital signals, values stored as vectors) and computing a correlation value. The correlation value is evaluated based on a correlation requirement (e.g., threshold, range), that may include a margin of error for data transmission. For example, the correlation requirement may be selected as 0.95 to account for errors in the transmission of the collected data over wireless networks and/or to account for errors in conversion from analogue to digital, or other non-malicious activity errors. The correlation may be performed, for example, by a mapping of the data, for example, values of parameters of the data are compared, for example, maximum speed during the last 30 minutes, and tire pressure.

At 608, an indication of malicious activity that changed the data sent out from the vehicle relative to the data sensed by the sensor(s) is detected based on the identified mismatch. Detecting the compromise of the integrity of the data set out from the vehicle is indicative of malicious activity.

At 610, an output message indicative of the detected malicious activity is provided, for example, presented on a GUI of the vehicle, transmitted as a message to a mobile device of the driver, presented as a pop-up of a display of third party server 513, and/or played as an audio message to the driver (e.g., as a phone call to a phone in the vehicle).

The output message may be used as a trigger for further investigation to determine whether the data is compromised by malicious activity, or another reason (e.g., error in manufacturing, program crash, data transmission errors). The investigation may be performed automatically by code (e.g., anti malicious code software) and/or manually (e.g., by an administrator).

Reference is now made to FIGS. 1B-C, which are additional exemplary methods for detecting malicious activity in a network of a vehicle. Referring now to FIG. 1B, from the perspective of server 512:

At 402, the server receives sensor data defined as normal operation, unaffected by malicious activity (e.g., without malicious code executing within the computing unit and/or without tampering of the data by malicious actions). The normal operation sensor data may be received from sensors of vehicles being driven on the road, as part of a data collection phase, and/or as part of the vehicles being driven by the drivers in a normal manner.

The normal operation designation may be automatically designated by code (e.g., by tagging the data with a digital tag) and/or manually designated by a user manually tagging the data with the digital tag (e.g., the user reviews the data first to make sure that the computing unit is free from malicious activity).

The data may be collected during the initial data collection phase as part of the manufacturing process, and/or collected dynamically throughout the life cycle of the vehicles to generate a large set of data under different conditions.

Optionally, the data is categorized and/or labeled according to one or more unified internal parameters. The categories improve the ability to detect the malicious activity, by defining what is normal operation for certain conditions. For example, normal operation in snowy weather may be abnormal operation in the summer. For example, normal operation for a 4×4 pickup may be abnormal for a small car. Exemplary unified internal parameters include: transportation infrastructure indicators, car manufacturers indicators, car type indicator, traffic control indicators, road tolls indicators, cellular communication network indicators, home area network indicators, electric grids and payment system indicators, telematics based insurance indicators, payment gateways indicators, location indicators, vehicle-to-vehicle communication indicators, weather, geographical location, time of day, and day of the year.

At 404, the data defined as normal operation is aggregated and/or used to train a statistical classifier to differentiate between new sensor data that is normal operation and indicative of malicious activity.

As used herein, the term classifier (or the term statistical classifier) means a machine learning method, for example, a neural network, a statistical classifier a decision tree, a set-of-rules, regression methods, support vector machine, k-nearest neighbor, and the like. The classifier receives as input sensor data, and outputs an indication of malicious activity or an indication of normal operation. The classifier may output a probability of accuracy of the prediction.

At 406, sensor data is received from a computing unit of a vehicle. The sensor data is received for analysis by the server to determine whether or not the sensor data is associated with malicious activity executing within the computing unit of the vehicle, acquired by at least one sensor associated with the vehicle.

The sensor data may be analogue signal data (e.g., raw signal) collected by sensor(s) of the vehicle. The sensor data may be digital data measured by the sensor(s) and/or converted into digital form by an analogue to digital component of the vehicle.

At 408, the received sensor data is analyzed by the server. The analysis may be performed by correlating the received sensor data with data defined as normal operation without malicious activity.

The analysis may be performed by applying the trained statistical classifier to the received sensor data.

The analysis may be performed by code that computes a correlation between the at least one sensor data and the data defined as normal operation without malicious activity according to a correlation requirement, for example, a correlation function that computes the similarity between the received analogue signal pattern and analogue signal patterns defined as normal operation.

The analysis may be performed by correlating the received sensor data with data defined as normal operation without malicious activity according to one or more common unified internal parameters.

At 410, an indication of malicious activity installed in the computing unit of the vehicle is created according to the analysis. The malicious activity may be identified absolutely, for example, by the classifier that output the indication of malicious activity. The malicious activity may be identified based on a probability of the presence of malicious activity according to a probability requirement, for example, a threshold, a range, and/or a function. For example, malicious activity may be identified when the analysis identifies the presence of malicious activity with a probability of over 70%.

At 412, the indication of the malicious activity is transmitted to the computing unit of the vehicle from which the sensor data was received. The indication of malicious activity may be transmitter to other locations, for example, to a server of the manufacturer to alert that malicious activity is found.

Optionally, at 414, the server tags the received sensor data with a tag indicative of an association with malicious activity, (i.e., when malicious activity is identified). The sensor data associated with malicious activity may be used to create a dataset of sensor data defined as associated with malicious activity. The dataset maybe used to update the statistical classifier using the sensor data and tag. The updated statistical classifier is able to more accurately detect the presence of the malicious activity in other computing units of other vehicles.

Referring now to FIG. 1C, from the perspective of computing unit 504 (installed within vehicle 501):

At 450, sensor data is acquired by sensor(s) associated with the vehicle. The sensor data may be acquired as part of a self-integrity data analysis performed during a secure boot process to verify that the computing unit of the vehicle is started using a trusted source. For example, the sensor data may be collected when the engine of the vehicle is turned on, dynamically and/or continuously during driving, at random times, at predefined intervals, and/or at defined events (e.g., crash, driving during hazardous conditions, driving at fast speeds).

At 452, the sensor data for sending to the server may be created by aggregating signals from multiple sensors. For example, the signals may be stored as a vector, may be computed into another value (e.g., by applying a hash function, by a computation between signals of different sensors), or may be sent raw.

The sensor data for sending to the server may be based on time windows, for example, 1 second, 5 seconds, 10 seconds, or values computed based on time windows, for example maximum speed in the last 30 seconds, or other computed values.

The acquired signals may be further processed to generate the sensor data for sending to the server, for example, signals from multiple sensors may be processed to compute an indication that the user is about to move into the oncoming lane.

As used herein, the term sensor data may refer to higher level values computed based on low level signals received from multiple sensors, for example, an indication of fatigue of the user determined based on data from multiple sensors (e.g., detection of swerving, breathing pattern of the user, and eye blinking).

At 454, the sensor data is transmitted to the central server over the network, which may include a wireless network.

At 456, an indication of the presence of malicious activity within the computing unit of the vehicle is received from the server (e.g., as described with reference to FIG. 1B).

At 458, the indication of malicious activity is presented, for example, as a message in a graphical user interface (GUI) of a display of the vehicle, on a Smartphone (or other mobile device) of the user, as a light on the dashboard of the vehicle, as an email sent to an email account of the user, as an audio message heard through the speaker system of the vehicle, and/or as an audio message provided as a call to the phone of the user.

Figure 3:
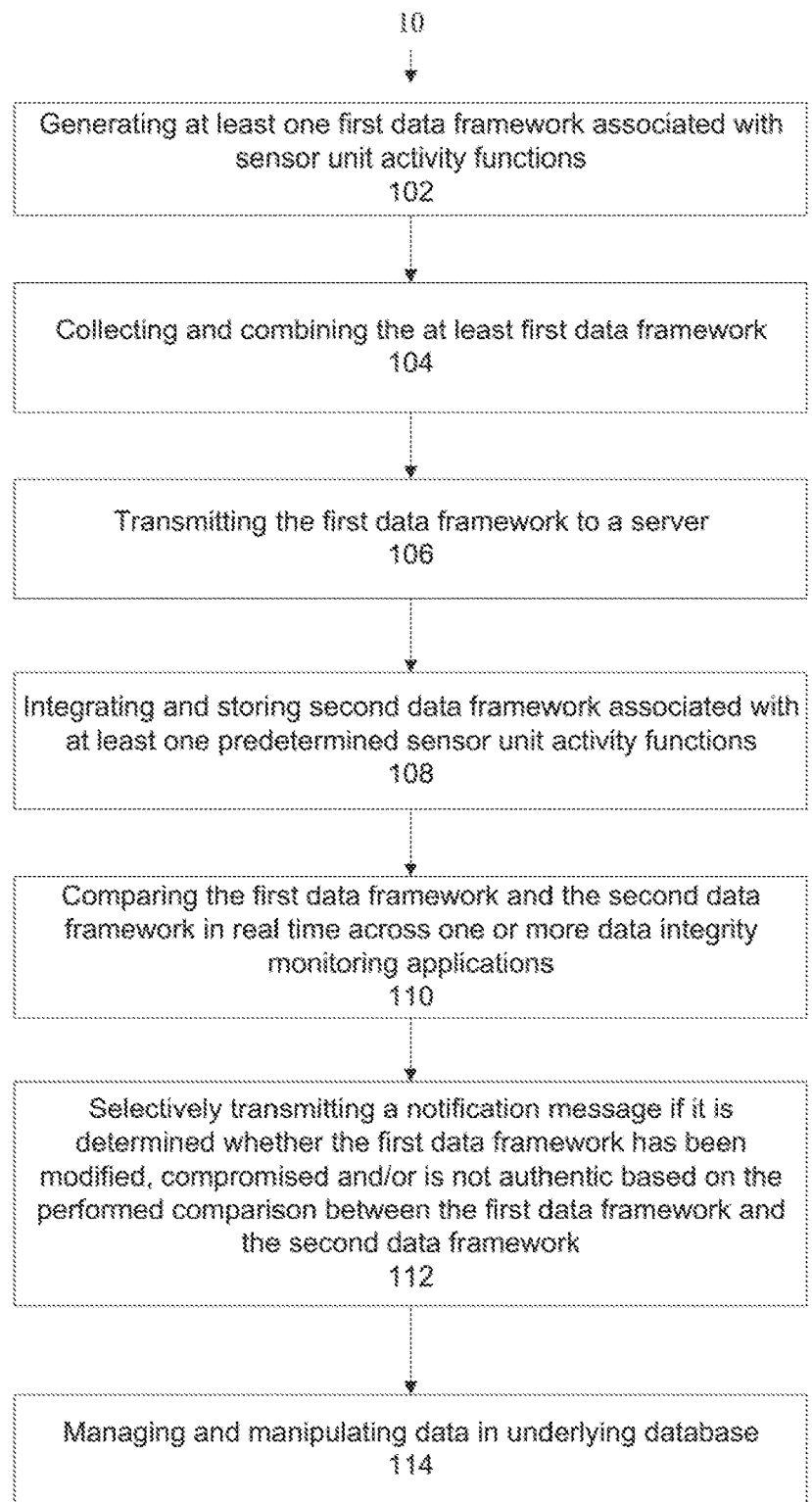
FIG. 3 is a flowchart of another implementation of the method for monitoring data integrity of the vehicle network, in accordance with some embodiments of the present invention.

Reference is now made to FIG. 3, which is a flowchart of a method for an on-car vehicle network data integrity monitoring 10, in accordance with some embodiments of the present invention. The method includes, for one or more iterations, acts of generating at least one first data framework associated with sensor unit activity functions 102, collecting and combining the at least first data framework 104, transmitting the first data framework to a server 106, integrating and storing second data framework associated with at least one predetermined sensor unit activity functions 108, comparing the first data framework and the second data framework in real time across one or more data integrity monitoring applications 110, selectively transmitting a notification message if it is determined whether the first data framework has been modified, compromised and/or is not authentic based on the performed correlation between the first data framework and the second data framework 112, and managing and manipulating data in underlying database 114.

Figure 4:
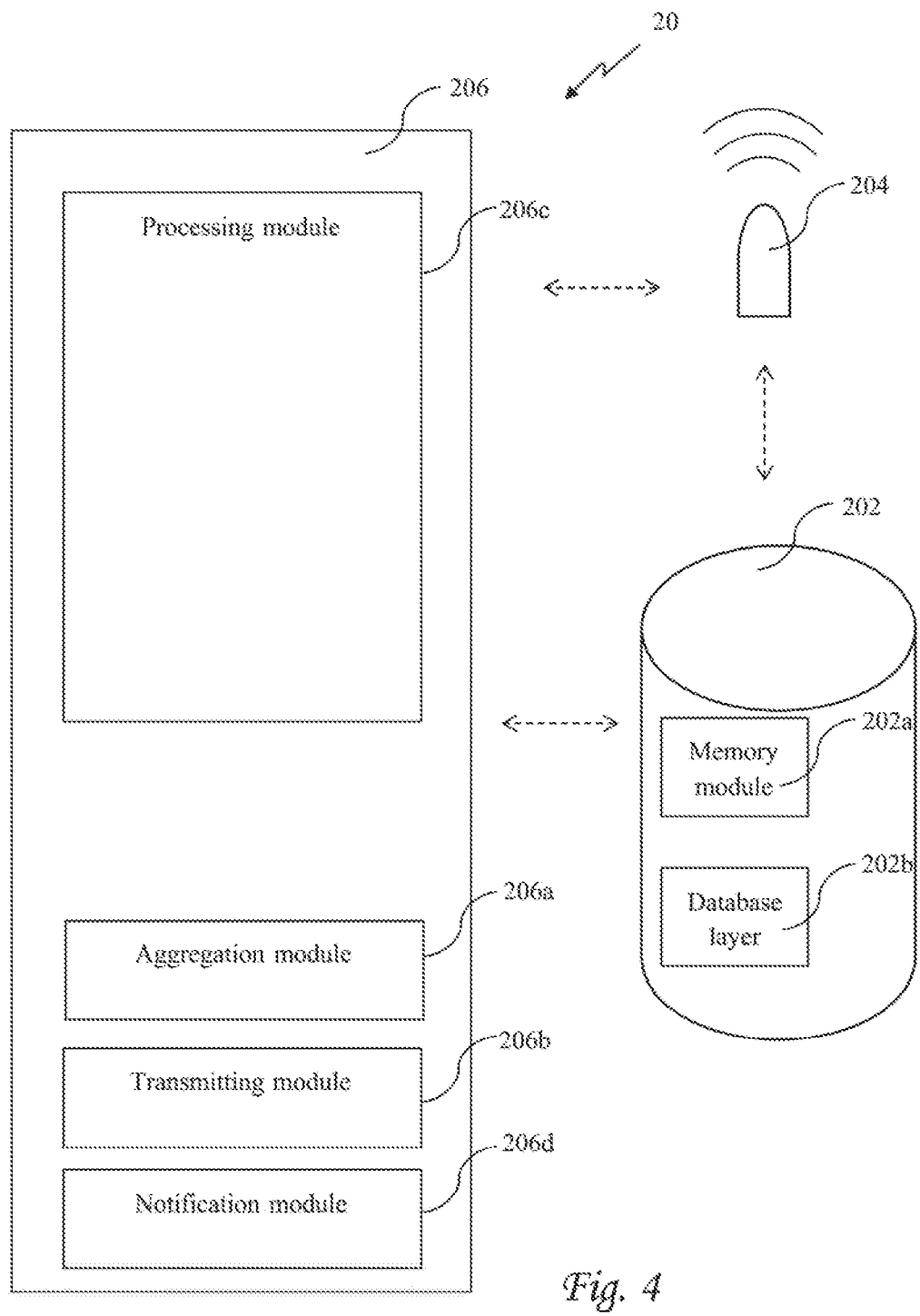
FIG. 4 is a block diagram of another implementation of the system that monitors data integrity of the vehicle network, in accordance with some embodiments of the present invention.

Reference is now made to FIG. 4, which is a block diagram of an exemplary embodiment of a system that may implement the acts of the method described with reference to FIG. 3, in accordance with some embodiments of the present invention. An on-car vehicle network data integrity monitoring system 20 includes: a monitoring server 202, at least one sensor unit 204 connected via a data transmission connection to an electronic control unit (ECU) 206 and configured to generate at least one first data framework associated with the sensor unit activity functions, the electronic control unit (ECU) 206 connected via a data transmission connection to the server 202 and the at least one sensor unit 204 so as to be communicable with the at least one sensor unit in real time across one or more data integrity monitoring applications, the electronic control unit 206 further comprises: an aggregation module 206a configured to collect and combine the first data framework, a transmitting module 206b connected via a data transmission connection to the server and configured to transmit the first data framework to the server, a processing module 206c connected via a data transmission connection to the electronic control unit and configured to compare the first data framework and the second data framework in real time across one or more data integrity monitoring applications. The processing module is configured to detect if the first data framework has been modified, compromised and/or is not authentic based on the performed correlation between the first data framework and the second data framework, configured to perform self-integrity data analysis of the first data framework in a secure boot process to facilitate that the system is started via a trusted source and/or process, configured to perform fail secure if it is determined whether the first data framework has been modified, compromised and/or is not authentic based on the performed self-integrity data analysis, and a notification module 206d configured to selectively transmit a notification message when it is determined that the first data framework has been modified, compromised and/or is not authentic based on the performed correlation between the first data framework and the second data framework, configured to issue a warning when it is determined that the first data framework is modified, compromised and/or is not authentic based on the performed self-integrity data analysis. Server 202 further comprises: a memory module 202a configured to integrate and store second data framework associated with at least one predetermined sensor unit activity functions, a database layer 202b communicably coupled to the electronic control unit, and configured to manage and manipulate data in underlying database.

Figure 5:
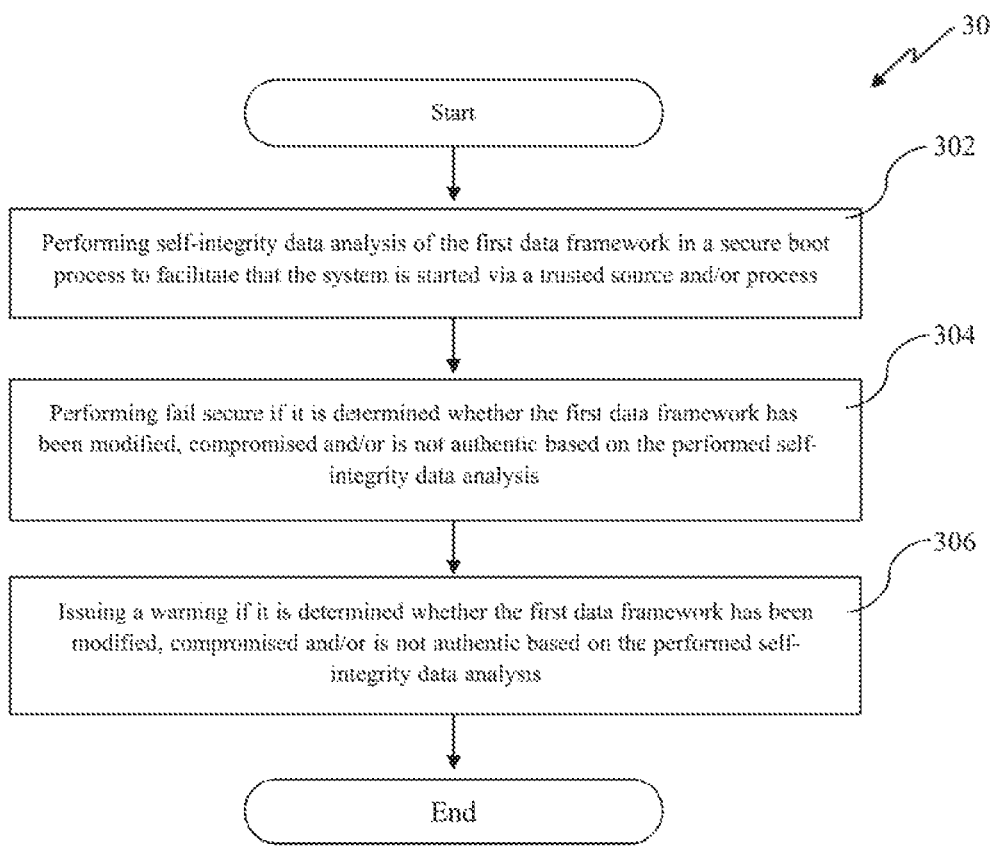
FIG. 5 is a flowchart of an exemplary method for performing self-integrity data analysis, in accordance with some embodiments of the present invention.

Reference is now made to FIG. 5, which is a flowchart of a method for a self-integrity data analysis 30, in accordance with some embodiments of the present invention. The method comprising, for one or more iterations, acts of performing self-integrity data analysis of the first data framework in a secure boot process to facilitate that the system is started via a trusted source and/or process 302, performing fail secure if it is determined whether the first data framework has been modified, compromised and/or is not authentic based on the performed self-integrity data analysis 304, issuing a warning if it is determined whether the first data framework has been modified, compromised and/or is not authentic based on the performed self-integrity data analysis 306.

According to an aspect of some embodiments of the present invention there is provided an on-car vehicle network system, the system comprising: a monitoring server; at least one sensor unit connected via a data transmission connection to an electronic control unit (ECU) and configured to generate at least one first data framework associated with the sensor unit activity functions; the electronic control unit (ECU) connected via a data transmission connection to the server and the at least one sensor unit so as to be communicable with the at least one sensor unit in real time across one or more data integrity monitoring applications; wherein the electronic control unit further comprises: an aggregation module configured to collect and combine the first data framework; a transmitting module connected via a data transmission connection to the server and configured to transmit the first data framework to the server; a processing module connected via a data transmission connection to the electronic control unit and configured to compare the first data framework and the second data framework in real time across one or more data integrity monitoring applications; and a notification module configured to selectively transmit a notification message if it is determined whether the first data framework has been modified, compromised and/or is not authentic based on the performed correlation between the first data framework and the second data framework; wherein the server further comprises: a memory module configured to integrate and store second data framework associated with at least one predetermined sensor unit activity functions; a database layer communicably coupled to the electronic control unit, and configured to manage and manipulate data in underlying database.

Optionally, the processing module is further configured to detect if the first data framework has been modified, compromised and/or is not authentic based on the performed correlation between the first data framework and the second data framework.

Optionally, the second data framework is derived and updated from data pattern analysis of unified internal parameters based on at least one relevant sensor unit applications.

Optionally, the unified internal parameters are selected from the group consisting of transportation infrastructure indicators, car manufacturers indicators, traffic control indicators, road tolls indicators, cellular communication network indicators, home area network indicators, electric grids and payment system indicators, telematics based insurance indicators, payment gateways indicators, location indicators, vehicle-to-vehicle communication indicators, and any combination thereof.

Optionally, the at least one sensor unit is a quantified self auto (QS) sensor that measure biometric(s) of the driver.

Optionally, the at least one sensor unit is selected from passive safety sensors.

Optionally, the passive safety sensors are selected from a group consisting of airbag sensors, seat belt sensors, steering wheel sensors, vision sensors, fatigue detection sensors, pedestrian recognition sensors, tire pressure monitoring sensors, and any combination thereof.

Optionally, the at least one sensor unit is selected from active safety sensors.

Optionally, the active safety sensors are selected from a group consisting of brake sensors, driver assist sensors, steering control sensors, linkage and suspension sensors, and any combination thereof.

Optionally, the at least one sensor unit is selected from integrated safety sensors.

Optionally, the integrated safety sensors are selected from a group consisting of pre-crash emergency brake sensors, lane departure warning sensors, park assist sensors, roll over protection sensor, collision warning sensor, and any combination thereof.

Optionally, the at least one sensor unit is selected from vehicle and/or vehicle's user authentication sensors.

Optionally, the vehicle user authentication sensors are selected from a group consisting of keyless authentication sensors, battery consumption sensors, gas consumption sensors, vehicle life cycle sensors, DYIdiagnostics sensors, DYImaintenance sensors, build-in transaction sensors, blockchain-related sensors, and any combination thereof.

Optionally, the processing module is further configured to perform self-integrity data analysis of the first data framework.

Optionally, the processing module performs self-integrity data analysis of the first data framework in a secure boot process to facilitate that the system is started via a trusted source and/or process.

Optionally, the processing module is further configured to perform fail secure if it is determined whether the first data framework has been modified, compromised and/or is not authentic based on the performed self-integrity data analysis.

Optionally, the notification module is further configured to issue a warning if it is determined whether the first data framework has been modified, compromised and/or is not authentic based on the performed self-integrity data analysis.

According to an aspect of some embodiments of the present invention there is provided a method for an on-car vehicle network data integrity monitoring, the method comprising steps of: generating at least one first data framework associated with sensor unit activity functions; collecting and combining the at least first data framework; transmitting the first data framework to a server; integrating and storing second data framework associated with at least one predetermined sensor unit activity functions; comparing the first data framework and the second data framework in real time across one or more data integrity monitoring applications; selectively transmitting a notification message if it is determined whether the first data framework has been modified, compromised and/or is not authentic based on the performed correlation between the first data framework and the second data framework; and managing and manipulating data in underlying database.

Optionally, the method is further comprises a step of detecting if the first data framework has been modified, compromised and/or is not authentic based on the performed correlation between the first data framework and the second data framework.

Optionally, the second data framework is derived and updated from data pattern analysis of unified internal parameters based on at least one relevant sensor unit applications.

Optionally, the unified internal parameters are selected from the group consisting of transportation infrastructure indicators, car manufacturers indicators, traffic control indicators, road tolls indicators, cellular communication network indicators, home area network indicators, electric grids and payment system indicators, telematics based insurance indicators, payment gateways indicators, location indicators, vehicle-to-vehicle communication indicators, and any combination thereof.

Optionally, the at least one sensor unit is selected from passive safety sensors.

Optionally, the passive safety sensors are selected from a group consisting of airbag sensors, seat belt sensors, steering wheel sensors, vision sensors, fatigue detection sensors, pedestrian recognition sensors, tire pressure monitoring sensors, and any combination thereof.

Optionally, the at least one sensor unit is selected from active safety sensors.

Optionally, the active safety sensors are selected from a group consisting of brake sensors, driver assist sensors, steering control sensors, linkage and suspension sensors, and any combination thereof.

Optionally, the at least one sensor unit is selected from integrated safety sensors.

Optionally, the integrated safety sensors are selected from a group consisting of pre-crash emergency brake sensors, lane departure warning sensors, park assist sensors, roll over protection sensor, collision warning sensor, and any combination thereof.

Optionally, the at least one sensor unit is selected from vehicle and/or vehicle's user authentication sensors.

Optionally, the vehicle user authentication sensors are selected from a group consisting of keyless authentication sensors, battery consumption sensors, gas consumption sensors, vehicle life cycle sensors, DYIdiagnostics sensors, DYImaintenance sensors, build-in transaction sensors, blockchain-related sensors, and any combination thereof.

Optionally, the method is further comprises a step of performing self-integrity data analysis of the first data framework.

Optionally, the step of performing self-integrity data analysis of the first data framework is executed in a secure boot process to facilitate that the system is started via a trusted source and/or process.

Optionally, the method is further comprises a step of performing fail secure if it is determined whether the first data framework has been modified, compromised and/or is not authentic based on the performed self-integrity data analysis.

Optionally, the method is further comprises a step of issuing a warning if it is determined whether the first data framework has been modified, compromised and/or is not authentic based on the performed self-integrity data analysis.

According to an aspect of some embodiments of the present invention there is provided a computer implemented method for detection of malicious activity in a computing unit of a vehicle, the method performed by a central server in wireless network communication with at least one computing unit installed in the vehicle, the method comprising: receiving at the server, from a computing unit installed in a vehicle, at least one sensor data acquired by at least one sensor associated with the vehicle, the at least one sensor measuring at least one parameter associated with the vehicle; analyzing, by the server, the at least one sensor data to identify an indication of malicious activity installed in the computing unit of the vehicle; and transmitting the indication of the malicious activity to the computing unit.

Optionally, the analyzing is performed by correlating the at least one sensor data with data defined as normal operation without malicious activity.

Optionally, the data defined as normal operation without malicious activity is collected from a plurality of computing units installed in a plurality of other vehicles.

Optionally, the analyzing is performed by at least one of: a statistical classifier trained on the data defined as normal operation without malicious activity, and based on a correlation between the at least one sensor data and the data defined as normal operation without malicious activity according to a correlation requirement.

Optionally, the at least one sensor data comprises analogue signals measured by respective sensors, and the correlation is performed between the analogue signals received from the computing unit and analogue signals defined as normal operation without malicious activity.

Optionally, the method further comprises tagging the received at least one sensor data with a tag indicative of an association with malicious activity, and updating a statistical classifier trained to perform the analyzing using the at least one sensor data and tag.

Optionally, the analyzing is performed by correlating the at least one sensor data with data defined as normal operation without malicious activity according to at least one common unified internal parameters.

Optionally, the unified internal parameters are selected from the group consisting of: transportation infrastructure indicators, car manufacturers indicators, car type indicator, traffic control indicators, road tolls indicators, cellular communication network indicators, home area network indicators, electric grids and payment system indicators, telematics based insurance indicators, payment gateways indicators, location indicators, vehicle-to-vehicle communication indicators, weather, geographical location, time of day, day of the year, and any combination thereof.

Optionally, the at least one sensor comprises at least one passive safety sensor. Optionally, the at least one passive safety sensor is selected from the group consisting: of airbag sensors, seat belt sensors, steering wheel sensors, vision sensors, fatigue detection sensors, pedestrian recognition sensors, tire pressure monitoring sensors, and any combination thereof.

Optionally, the at least one sensor comprises at least one active safety sensor. Optionally, the at least one active safety sensor is selected from the group consisting of: brake sensors, driver assist sensors, steering control sensors, linkage and suspension sensors, and any combination thereof.

Optionally, the at least one sensor comprises at least one integrated safety sensor. Optionally, the at least one integrated safety sensor is selected from the group consisting of: pre-crash emergency brake sensors, lane departure warning sensors, park assist sensors, roll over protection sensor, collision warning sensor, and any combination thereof.

Optionally, the at least one sensor comprises at least one vehicle user authentication sensor. Optionally, at least one vehicle user authentication sensor is selected from the group consisting of: keyless authentication sensors, battery consumption sensors, gas consumption sensors, vehicle life cycle sensors, DYIdiagnostics sensors, DYImaintenance sensors, build-in transaction sensors, blockchain-related sensors, and any combination thereof.

According to an aspect of some embodiments of the present invention there is provided a computer implemented method for detection of malicious activity in a computing unit of a vehicle, the method performed by a computing unit installed in the vehicle, the method comprising: receiving, by the computing unit, at least one sensor data acquired by at least one sensor associated with the vehicle, the at least one sensor measuring at least one parameter associated with the vehicle; transmitting the at least one sensor data to a central server in wireless network communication with the computing unit; and receiving, by the computing unit, an indication of malicious activity installed in the computing unit.

Optionally, the method further comprises creating the at least one sensor data by aggregation of signals from a plurality of sensors each measuring a respective parameter associated with the vehicle.

Optionally, the method further comprises presenting the indication of malicious activity as a message in a graphical user interface (GUI) of a display.

Optionally, the at least one sensor data is acquired as part of a self-integrity data analysis performed during a secure boot process to verify that the computing unit of the vehicle is started using a trusted source.

According to an aspect of some embodiments of the present invention there is provided a server for detection of malicious activity in a computing unit of a vehicle, comprising: a network interface for wireless communicating with respective computing unit of a plurality of vehicles; a program store storing code; and a processor coupled to the network interface and the program store for implementing the stored code, the code comprising: code to receive at least one sensor data acquired by at least one sensor associated with a certain vehicle of the plurality of vehicles, the at least one sensor measuring at least one parameter associated with the certain vehicle; and code to analyze the at least one sensor data to identify an indication of malicious activity installed in the computing unit of the certain vehicle; and transmit the indication of the malicious activity to the computing unit of the certain vehicle.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant vehicles, sensors, computing units, and servers will be developed and the scope of the terms vehicle, sensor, computing unit, and server are intended to include all such new technologies a priori.

As used herein the term "about" refers to □10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method for identifying an indication of malicious activity that changes the integrity of data sent out from a vehicle, comprising:

intercepting, by an output data monitoring agent that monitors data sent out from the vehicle to an external receiving computing unit using a communication interface in communication with a network, and collecting the data;

intercepting, by at least one sensor data monitoring agent that monitors sensor data outputted by at least one sensor associated with the vehicle, and collecting the sensor data;

wherein the data sent out from the vehicle is based on the sensor data, wherein the data sent out from the vehicle is intercepted by the output data monitoring agent prior to being processed by the receiving computing unit;

monitoring the integrity of the data sent out from the vehicle, by analyzing the data collected by the output data monitoring agent with the sensor data collected by the at least one sensor data monitoring agent, wherein the analyzing comprises converting the sensor data to a format used for transmission of the data sent out from the vehicle over the network and comparing the converted sensor data and the data intercepted by the output data monitoring agent to identify a mismatch;

identifying an indication of malicious activity that changed the data sent out from the vehicle relative to the data sensed by the at least one sensor; and providing an output message indicative of the malicious activity.

2. The method of claim 1, wherein the output data monitoring agent is executed on a server located externally to the vehicle, wherein the server comprises the receiving computing unit.

3. The method of claim 1, wherein the output data monitoring agent is executed on a computing unit located within the vehicle.

4. The method of claim 1, wherein the communication interface comprises a wireless transmitter, and wherein the output data monitoring agent monitors the wireless transmitter of the vehicle that transmits the data sent out from the vehicle to the receiving computing unit.

5. The method of claim 1, wherein the at least one sensor data monitoring agent sniffs at least one network of the vehicle.

6. The method of claim 5, wherein the at least one network installed in the vehicle includes one or more members selected from the group consisting of: canvas, can-fd, flexray, Ethernet.

7. The method of claim 1, wherein the at least one sensor data monitoring agent collects data from a transmission control unit (TCU) of the vehicle.

8. The method of claim 1, wherein the at least one sensor data monitoring agent directly monitors output of the at least one sensor using a splitter.

9. The method of claim 1, wherein the at least one sensor data monitoring agent monitors data transmitted over an electronic control unit (ECU) of the vehicle.

10. The method of claim 1, wherein the at least one sensor data monitoring agent receives low level data, and the output data monitoring agent receives high level data, and the analyzing is performed by code that converts the low level data to higher level data for analysis with the high level data.

11. The method of claim 10, wherein the low level data comprises analogue signals measured by the at least one sensor and the higher level data comprises at least one numerical value computed from the analogue signals.

12. The method of claim 1, wherein the monitoring of the integrity of the data is performed dynamically as the data is sensed by the at least one sensor.

13. The method of claim 1, wherein the data sent out from the vehicle is selected from the group consisting of: insurance data, safety data, car payment systems, driver authentication data.

14. A computing unit for identifying an indication of malicious activity that changes integrity of data sent out from a vehicle, comprising:

a program store storing code; and a processor coupled to the program store for implementing the stored code, the code comprising:

code to intercept, by an output data monitoring agent that monitors data sent out from the vehicle to an external receiving computing unit using a communication interface in communication with a network, and collect the data;

code to intercept, by at least one sensor data monitoring agent that monitors sensor data outputted by at least one sensor associated with the vehicle, and collect the sensor data;

wherein the data sent out from the vehicle is based on the sensor data, wherein the data sent out from the vehicle is intercepted by the output data monitoring agent prior to being processed by the receiving computing unit; and code to monitor the integrity of the data sent out from the vehicle by analyzing the data collected by the output data monitoring agent with the sensor data collected by the at least one sensor data monitoring agent, wherein the analyzing comprises converting the sensor data to a format used for transmission of the data sent out from the vehicle over the network and comparing the converted sensor data and the data intercepted by the output data monitoring agent to identify a mismatch, identify an indication of malicious activity that changed the data sent out from the vehicle relative to the data sensed by the at least one sensor; and provide an output message indicative of the malicious activity.

15. The computing unit of claim 14, wherein the computing unit is implemented as a server located externally to the vehicle, wherein the server receives the data sent out from the vehicle and the data sensed by at least one sensor, over the network that provides communication between the server and the vehicle.

16. The computing unit of claim 15, wherein the server is in communication with a second server of a third party that receives the data sent out from the vehicle, wherein the second server of the third party provides the data sent out from the vehicle to the server, wherein the data sensed by at least one sensor is transmitted by the vehicle to the server.

17. The computing unit of claim 14, wherein the computing unit is installed within the vehicle to monitor the integrity of the data sent out by the vehicle to a server located externally to the vehicle.

18. The computing unit of claim 14, wherein the at least one sensor data includes raw signals sensed by the at least one sensor and the data sent out by the vehicle includes data created by processing the raw signals.

19. A computer program product comprising a non-transitory computer readable storage medium storing program code thereon for implementation by at least one processor of a computing unit, for detecting an indication of malicious activity that changes integrity of data sent out from a vehicle, comprising:

program instructions to intercept, by an output data monitoring agent that monitors data sent out from the vehicle to an external receiving computing unit using a communication interface in communication with a network, and collect the data;

program instructions to intercept, by at least one sensor data monitoring agent that monitors sensor data outputted by at least one sensor associated with the vehicle, and collect the sensor data;

wherein the data sent out from the vehicle is based on the sensor data, wherein the data sent out from the vehicle is intercepted by the output data monitoring agent prior to being processed by the receiving computing unit;

program instructions to monitor the integrity of the data sent out from the vehicle by analyzing the data collected by the output data monitoring agent with the sensor data collected by the at least one sensor data monitoring agent, wherein the analyzing comprises converting the sensor data to a format used for transmission of the data sent out from the vehicle over the network and comparing the converted sensor data and the data intercepted by the output data monitoring agent to identify a mismatch;

program instructions to identify an indication of malicious activity that changed the data sent out from the vehicle relative to the data sensed by the at least one sensor; and program instructions to provide an output message indicative of the malicious activity.

20. The method of claim 1, wherein the comparing comprises applying a correlation value to at least one of the sensor data and the data collected by the output data monitoring agent to account for at least one of data transmission error and a conversion from analogue to digital error.

* * * * *